United States Patent [19]

Tanaka et al.

[11] Patent Number: 5,590,153

[45] Date of Patent: Dec. 31, 1996

[54] DIGITAL MODEM FOR REDUCING INTERFERENCE IN THE SAME CHANNEL OF ANOTHER SYSTEM

[75] Inventors: Yutaka Tanaka; Minoru Honda, both of Tokyo, Japan

[73] Assignee: Nippon Hoso Kyokai, Tokyo, Japan

[21] Appl. No.: 277,413

[22] Filed: Jul. 18, 1994

Related U.S. Application Data

[63] Continuation of Ser. No. 913,449, Jul. 15, 1992, abandoned.

[30] Foreign Application Priority Data

Jul. 17, 1991 [JP] Japan .................................. 3-201172

[51] Int. Cl.$^6$ .................................. H04B 1/38; H04L 5/16
[52] U.S. Cl. .......................... 375/222; 375/260; 348/469
[58] Field of Search .................................. 348/487, 471, 348/388, 390, 392, 469; 375/219, 220, 221, 222, 286, 260, 261, 264

[56] References Cited

U.S. PATENT DOCUMENTS

| 4,408,189 | 10/1983 | Betts et al. ........................... 375/17 |
| 4,641,179 | 2/1987 | LoCicero et al. ..................... 358/12 |
| 4,816,783 | 3/1989 | Leitch ................................... 375/39 |
| 5,170,413 | 12/1992 | Hess et al. ............................ 375/38 |
| 5,214,656 | 5/1993 | Chung et al. ......................... 375/39 |

*Primary Examiner*—Stephen Chin
*Assistant Examiner*—Hai H. Phan
*Attorney, Agent, or Firm*—Antonelli, Terry, Stout & Kraus

[57] ABSTRACT

In order to reduce radio interference jamming in the same channel exerting from an adjacent broadcasting area when a digitized image signal of, for example, high-definition television utilizing an idle channel in ground broadcasting of television is transmitted, a digital string such as a binary coded image signal is thinned out every predetermined digital period so as to be divided into two groups. Continuous digital strings of two series are formed by converting clock rates of the respective groups and converted into multi-value digits. Intermediate carriers are then modulated with the digital signals of the two series having their requisite bands compressed through quadrature modulation to form modulated carriers, and the modulated carriers are transmitted in bands of two divisional channels which escape from adjacent video and voice carriers, the power of which is responsible for the radio interference in the same channel. The carriers are subsequently received for reconstruction.

2 Claims, 7 Drawing Sheets

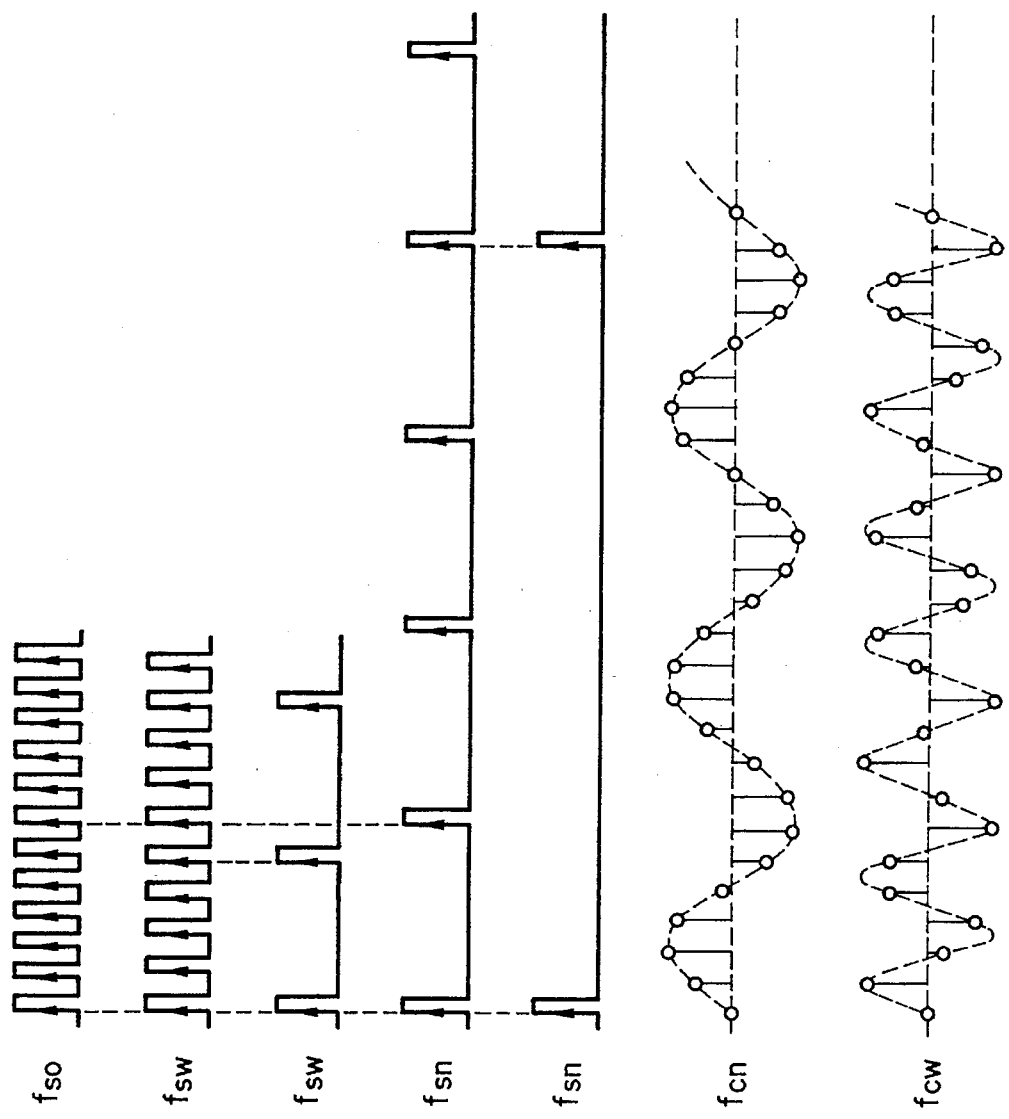

DIGITAL MODEM FOR REDUCING INTERFERENCE IN THE SAME CHANNEL OF ANOTHER SYSTEM

This application is a Continuation application of Ser. No. 07/913,449, filed Jul. 15, 1992, now abandoned.

BACKGROUND OF THE INVENTION

1. Field of the Invention

The present invention relates to a digital modem in which, in order to transmit a digital information signal such as a digitized high-definition television image signal by utilizing an idle channel in ground broadcasting of television, a carrier is modulated with the digital information signal and a received modulated carrier is demodulated to take out the digital information signal, and, more particularly, to this type of digital modem which can further reduce radio interference jamming in the same channel exerting from an adjacent broadcasting area.

2. Description of the Related Art

Conventionally, in ground broadcasting of television, the frequency is allotted every other channel to respective broadcasting areas to prevent adjacent channel jamming. It has hitherto been studied in U.S.A. to utilize an idle channel left in the frequency allotment affected every other channel so as to perform new television (ATV: Advanced Television) broadcasting such as high-definition television (HDTV) broadcasting without causing any trouble in reception of standard type television broadcasting. The ATV scheme is called simulcast scheme. Typically, idle channels for adjacent ground broadcasting areas are shifted from each other to avoid radio interference jamming in the same channel between the adjacent ground broadcasting areas. Therefore, when the simulcast utilizes an idle channel left in the frequency allotment for each broadcasting area, an adjacent ground broadcasting exerts radio interference jamming in the same channel on reception of the ATV broadcasting. This raises many difficulties in the development of ATV broadcasting.

Proposed in signal transmission of ATV broadcasting of simulcast type is the use of digital modulation which can advantageously permit signal transmission of the same quality as that of signal transmission in the conventional television ground broadcasting at a lower carrier to noise (C/N) ratio than that obtained with vestigial side-band amplitude modulation (VSB-AM) used in the television ground broadcasting, thus ensuring that reduction of reception trouble exerting on the existing VSB-AM type broadcasting can be achievable by making transmission power lower in ATV broadcasting than in VSB-AM type broadcasting. In the ATV broadcasting simulcast scheme using the conventionally common type of digital modulation, radio interference jamming in the same channel exerting from a newly built ATV station on the existing NTSC station is taken into account and resolved by reducing transmission power of the ATV station as described previously, but no countermeasure against radio interference jamming in the same channel exerting from the existing NTSC station on the newly, later-built ATV station has been taken into consideration. Accordingly, the desirable/undesirable (D/U) electric wave ratio of ATV broadcasting electric wave with reduced transmission power to NTSC broadcasting electric wave from adjacent broadcasting areas is degraded significantly, making it impossible to receive and demodulate the ATV broadcasting electric wave, and the reception trouble in ATV broadcasting is a significant problem to be solved in the course of development of ATV broadcasting.

SUMMARY OF THE INVENTION

The present invention intends to solve the aforementioned conventional problems and its object is to provide a novel digital modem wherein a principal modulation component of an ATV broadcasting electric wave is arranged in the same channel so as to escape from a principal power component of NTSC broadcasting electric wave in the same channel to reduce the radio interference jamming in the same channel drastically as compared to the prior art.

In a digital modem according to the invention, an ATV broadcasting digital information signal having the basic form of a binary code string is changed and divided so as to be transmitted in a plurality of divisional bands in the same channel in order that a principal modulation component of an ATV broadcasting electric wave can be arranged in the same channel so as to escape from a principal power component of NTSC broadcasting electric wave distributed near a carrier thereof in the same channel, and the digital modem comprises:

digital thin-out means for dividing an input binary code string, every predetermined digital period, into at least a digital group constituting a first series and a remaining digital group constituting a second series and converting a predetermined clock rate with respect to the respective series to form continuous digital strings of at least first and second series;

a digital modulator for modulating respective carriers with the digital strings of the first and second series to transmit modulated carriers in respective ones of a plurality of divisional channels obtained by dividing a predetermined channel;

clock rate conversion means for demodulating the modulated carriers to reproduce the continuous digital strings of the first and second series and converting clock rates of the first and second series into the predetermined clock rate; and digital synthesis means for synthesizing the digital groups of the first and second series having their clock rates converted to the predetermined clock rate to reproduce the input binary code string.

Accordingly, according to the present invention, the radio interference jamming in the same channel exerting from, for example, the NTSC broadcasting electric wave on the ATV broadcasting electric wave can be reduced more stably and significantly than in the prior art.

BRIEF DESCRIPTION OF THE DRAWINGS

FIG. 5 is a diagram sequentially showing examples of clock signals and intermediate carriers at respective stages in the digital modem according to the present invention.

DESCRIPTION OF THE PREFERRED EMBODIMENTS

The invention will now be described by way of example with reference to the accompanying drawings.

Figure 1A:
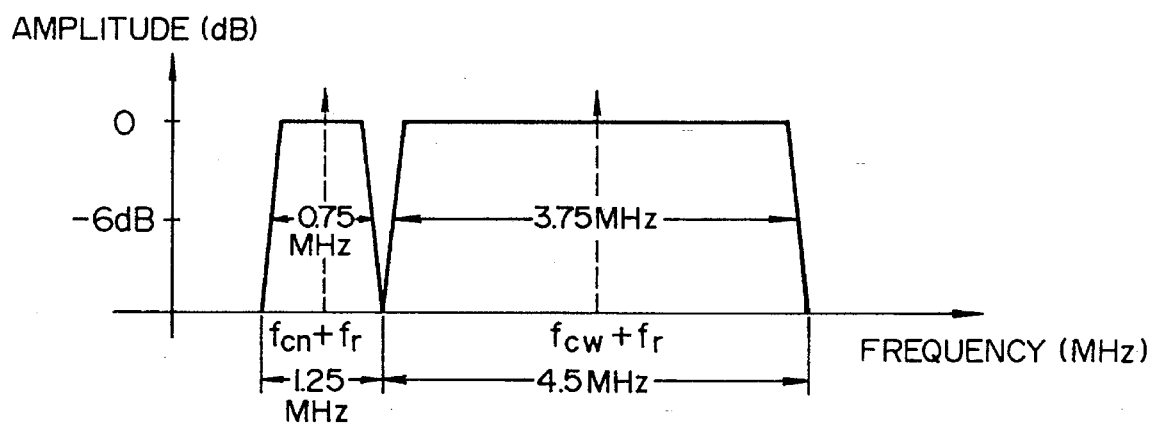
FIG. 1A illustrates a graph showing an example of a spectral distribution of digital modulation according to the present invention.
Figure 1B:
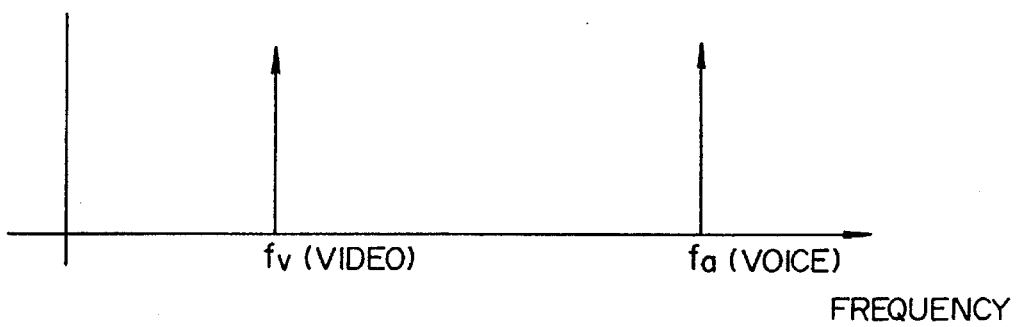
FIG. 1B illustrates a graph showing an example of carrier spectra of a radio interference jamming wave in the same channel.

Firstly, the basic operation of a digital modem of the invention will be described by making reference to FIG. 1. FIG. 1 illustrates at section (a) an example of a spectral distribution in digital modulation capable of being used in, for example, ATV broadcasting to avoid the radio interference jamming in the same channel in accordance with teachings of the present invention and at section (b) an example of spectra of video and voice carriers in NTSC broadcasting which exert the radio interference jamming in the same channel on ATV broadcasting wave, the distribution and spectra being in the same scale on frequency axis.

The basic operation shown in FIG. 1 of the modem of the invention will be described by referring to an example of a two-channel scheme wherein one channel of 6 MHz band width in ground broadcasting of standard type television is divided into two divisional channels (sub-channels) of upper wide band and lower narrow band which are bounded from each other by the NTSC video carrier and digital modulation spectra are distributed to the divisional channels. But even division of the one channel into three or more divisional channels which complies with structure and arrangement of the carrier constituting a main power component of radio interference jamming wave in the same channel can be practiced readily in a way like the two-channel division to be exemplified below.

For simplicity of explanation, a digital modulator of the invention shown in FIG. 3 and a digital demodulator of the invention shown in FIG. 4 will be described on the assumption that the number k of multi-valued levels of a binary code string and the thin-out ratio 1:m by which the binary code string is thinned out every period of m digits to provide a digital string of wide band series measure k=4 and 1:m= 5:6, respectively, but these values may obviously be changed to different ones as necessary.

Figure 2:
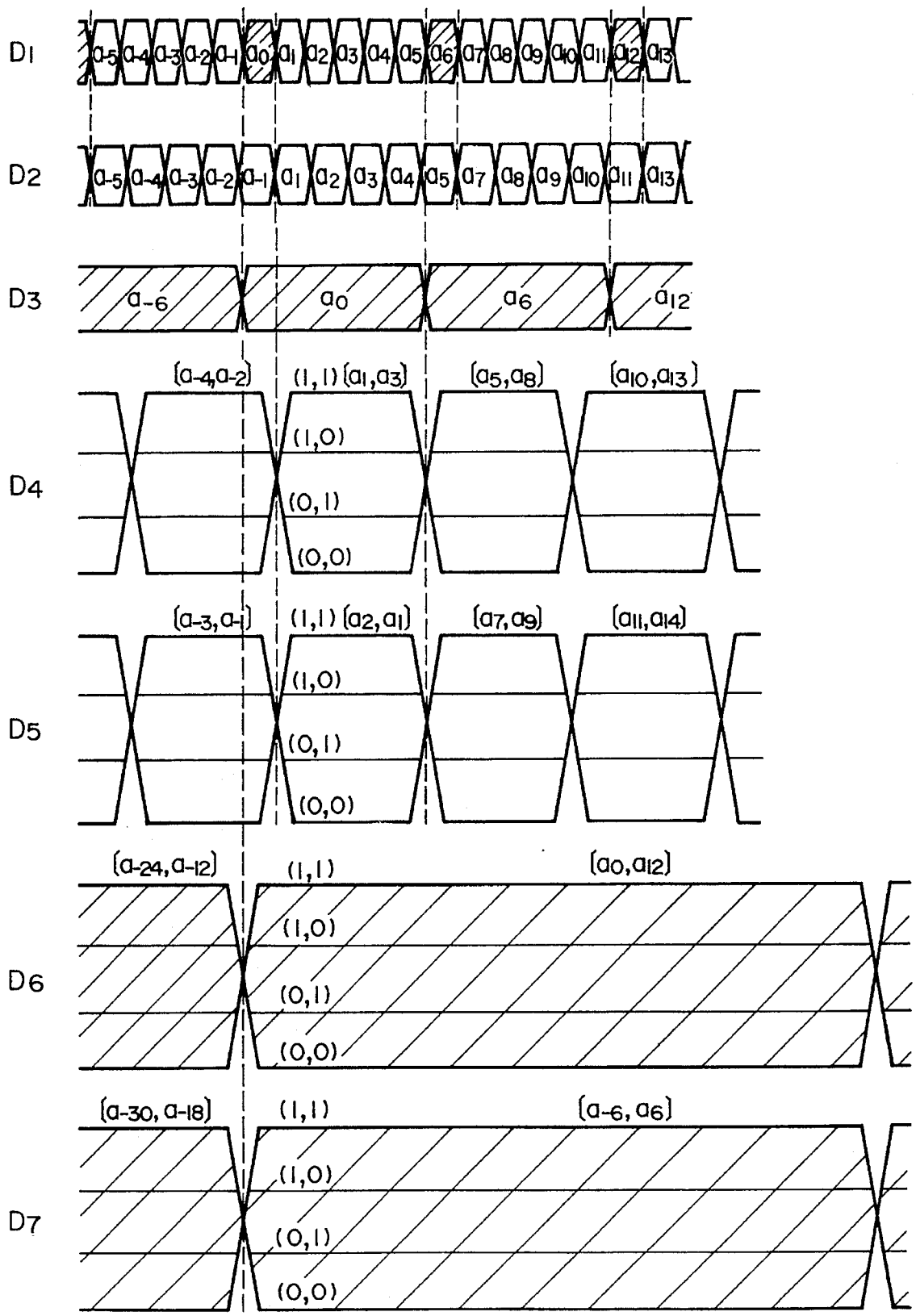
FIG. 2 is a diagram sequentially showing examples of structures of digital signals at respective stages in a digital modem according to the present invention.

The basic operation of the digital modem of the invention is described by making reference to FIG. 2 sequentially showing examples of digital data at respective stages, a binary code string D1 of a transmission rate of $f_{so}$ mega bit/second obtained by digitizing, for example, a television image signal and subjecting the digital signal to series conversion is input. The input binary code string D1 is periodically sorted into a digital string D2 of a wide band series of a 5/6 converted clock rate $f_{sw}$ mega bit/second, which digital string D2 is a residual digit group resulting from sequential thin-out of the input binary code string D1 carried out every period of 6 digits at digits $a_0, a_6, a_{12}, \ldots$ and a digital string D3 of a narrow band series of a 1/6 converted clock rate $f_{sn}$ mega bit/second, which digital string D3 is a digit group of sequentially thinned-out digits $a_0, a_6, a_{12}, \ldots$, whereby the digital strings D2 and D3 are respectively transmitted in the wide transmission band of a half-width of 3.75 MHz lying between the video and voice carriers as shown in FIG. 1 and in the narrow transmission band of a half-width of 0.75 MHz lower than the video carrier as shown in FIG. 1 in order to avoid bands near the video and voice carriers at which transmission power of NTSC broadcasting wave is concentrated, thereby ensuring that ATV broadcasting wave can be received when the ratio of desirability/undesirability to radio interference jamming wave in the same channel is not reduced enough to permit stable and steady reconstruction and reproduction of digital information signals.

In order that the aforementioned digital string D2 of wide band series and digital string D3 of narrow band series can be transmitted without trouble in the two divisional channels of wide and narrow bands obtained by dividing one channel of, for example, 6 MHz of the standard television scheme, digital level of a set of two digits extracted, for example, every other digit from the binary digital string D2 may preferably be converted to provide two series of four-value digital string forms D4 and D5 having a clock rate reduced to 1/4 and digital level of a set of two digits extracted, for example, every other digit from the binary string D3 may preferably be converted to provide two series of four-value digital string forms D6 and D7 having a clock rate reduced to 1/4 so as to reduce the requisite transmission band width.

It is to be noted that the digital data D1 to D7 sequentially shown in FIG. 2 are devoid of a time delay practically occurring in each digit during each signal processing at each stage, for better understanding of the correspondence relation between each digital subjected to the digit thin-out operation applied to the input binary code string, digital level conversion operation and clock rate conversion operation and that not subjected to these operations.

Figure 3:
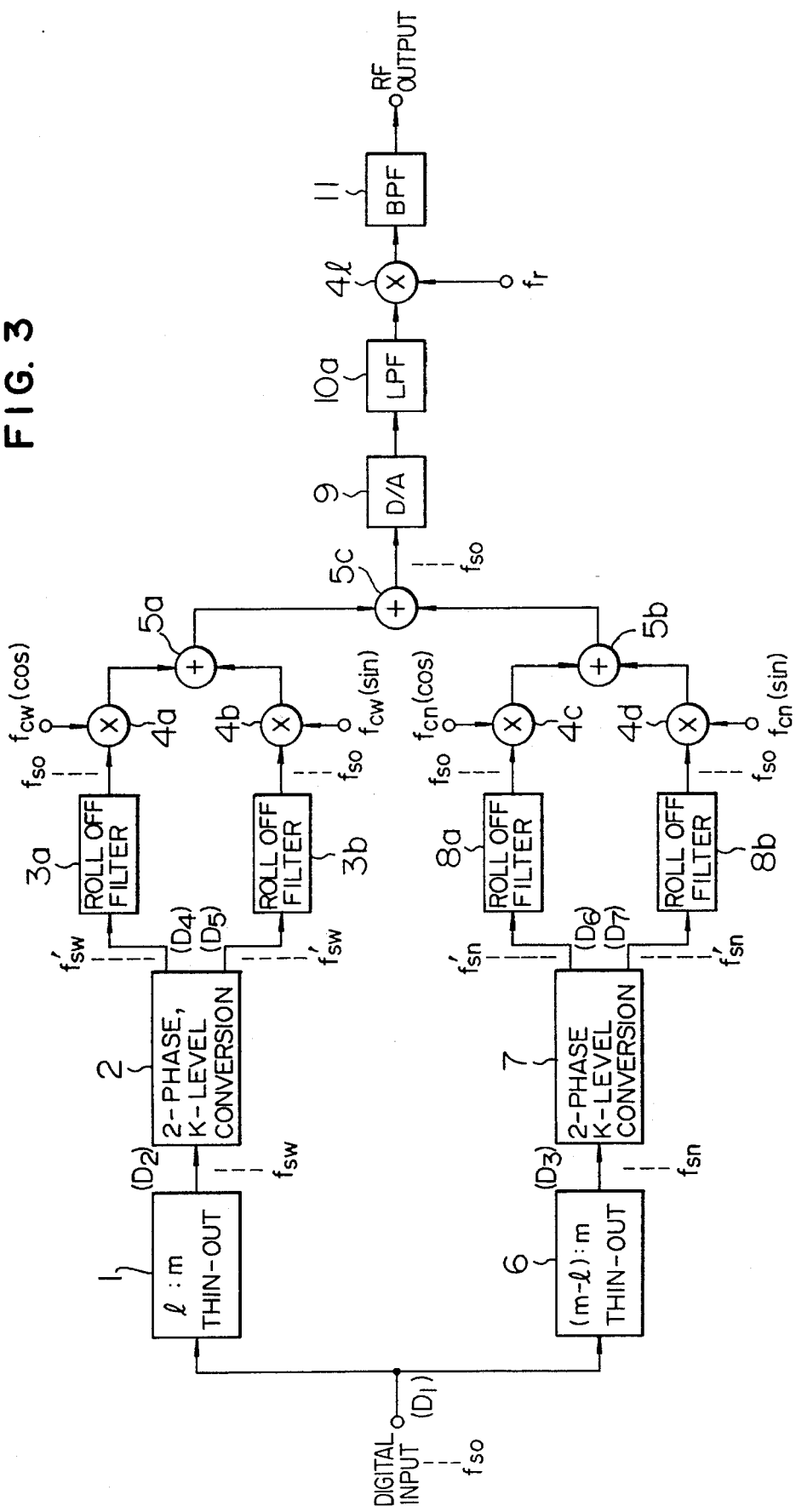
FIG. 3 is a block diagram showing an example of construction of a digital modulator according to the present invention.
Figure 4:
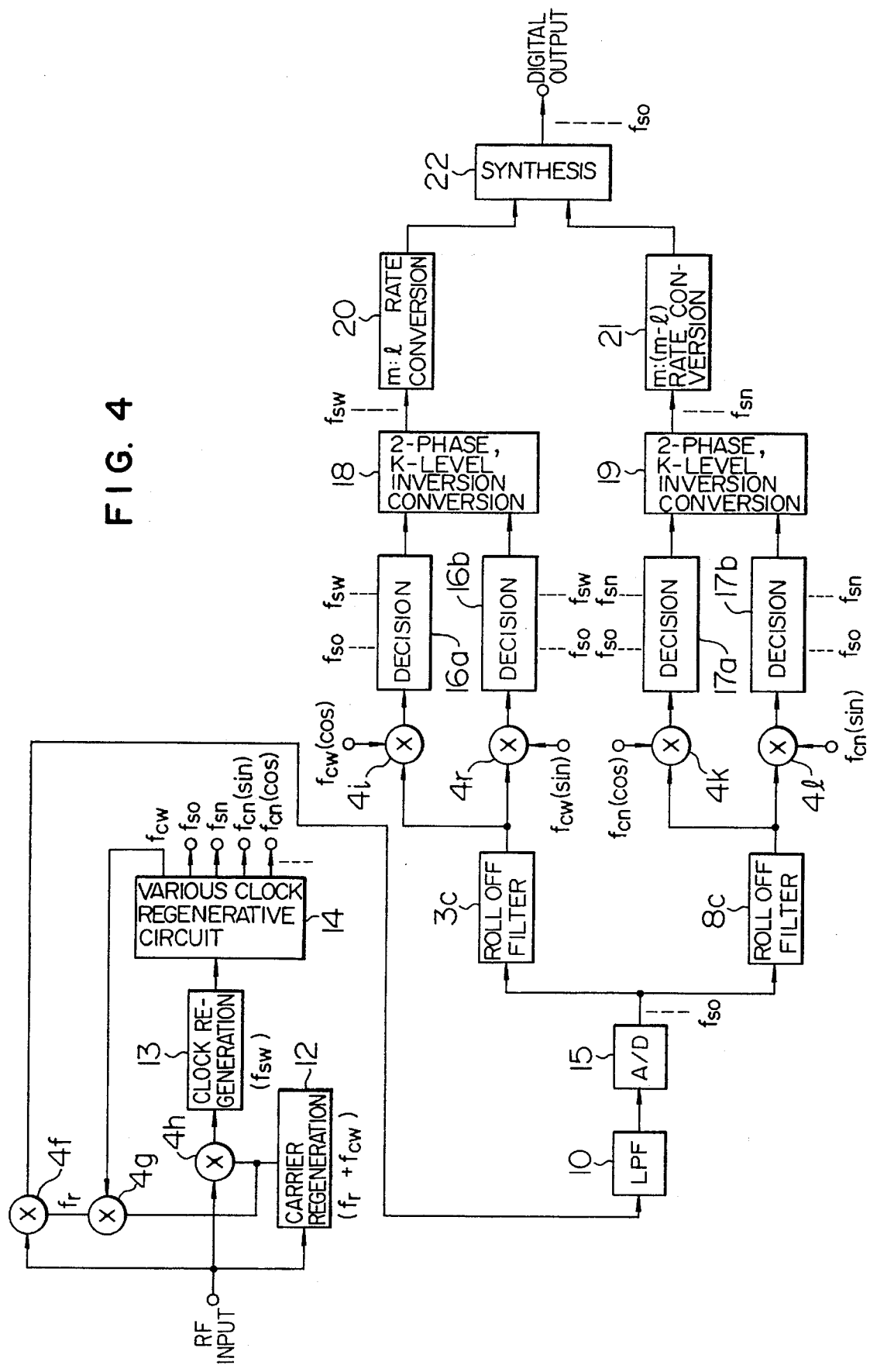
FIG. 4 is a block diagram showing an example of construction of a digital demodulator according to the present invention.
Figure 6A:
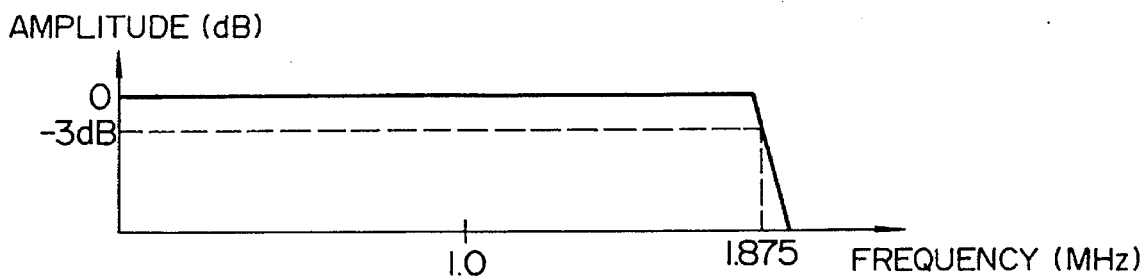
FIGS. 6A to 6D illustrate filter characteristics of various filters used in the digital modem according to the present invention.
Figure 6B:
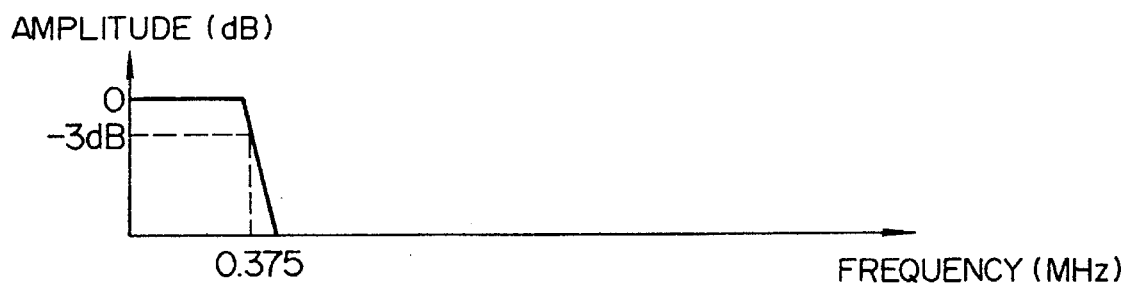
Figure 6C:
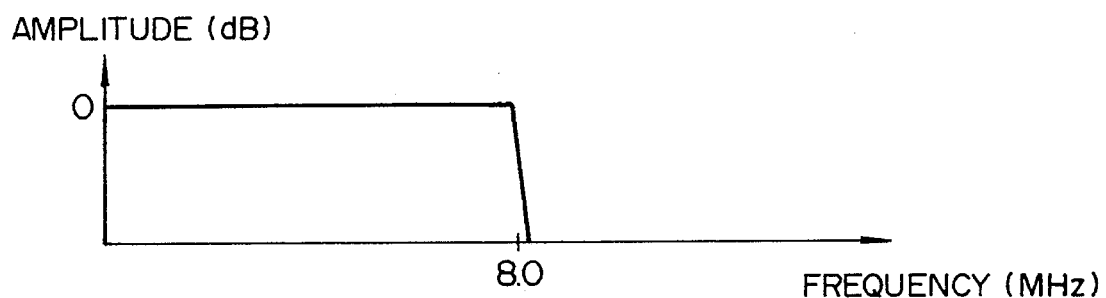
Figure 6D:
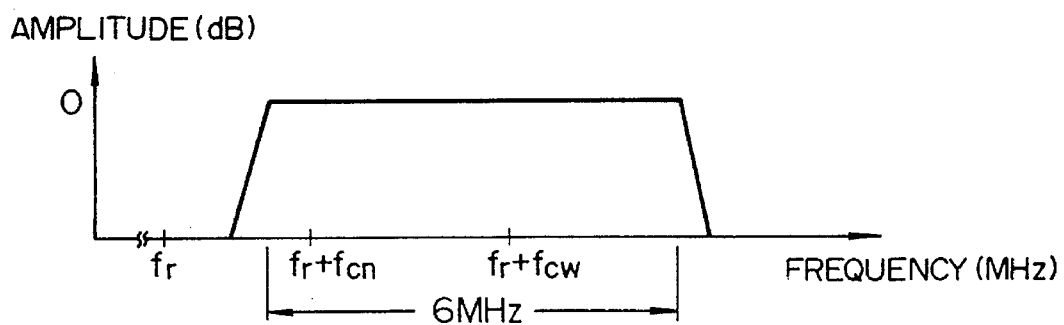

In connection with the digital modem of the present invention performing the basic operation described so far, an example of construction of a modulator is shown in FIG. 3, an example of construction of a demodulator is shown in FIG. 4, clock waveforms and carrier waveforms appearing at respective stages are sequentially shown in FIG. 5 and filter characteristics at respective sections are sequentially shown in FIG. 6. The operation of each of the modulator and demodulator will be described in greater detail with reference to these figures.

In the digital modulator shown in FIG. 3, an input binary code string D1 of a clock rate $f_{so}$ mega bit/second is supplied in parallel to thin-out circuits 1 and 6. In the thin-out circuit 1, the input binary code string D1 is thinned out at a ratio of 1:m of, for example, 5:6 and subjected to 5/6 clock rate conversion to provide a wide band series digital string D2 of a clock rate $f_{sw}$ mega bit/second which in turn is supplied to a 2-phase, k-level conversion circuit, for example, a 2-phase, 4-level conversion circuit 2; and similarly, in the thin-out circuit 6, the input binary code string D1 is also thinned out at a ratio of (m-1):m of, for example, 1:6 and subjected to 1/6 clock rate conversion to provide a narrow band series digital string D3 of a clock rate $f_{sn}$ mega bit/second which in turn is supplied to a 2-phase, k-level conversion circuit, for example, a 2-phase, 4-level conversion circuit 7. In the 2-phase, 4-level conversion circuit 2, a set of two digits extracted, for example, every two digits from the binary input digital string D2 is subjected to digital level conversion and the clock rate $f_{sw}$ of the set is 1/4 reduced to $f_{sw}'$ to provide two series of four-value digital strings D4 and D5 which in turn are supplied to wide band series roll off filters 3a and 3b having a filter characteristic shown at (a) in FIG. 6, so that the four-value digital string of each series is applied with band limitation and waveform shaping. Similarly, in the 2-phase, 4-level conversion circuit 7, a set of two digits extracted, for example, every two digits from the binary input digital string D3 is subjected to digital level conversion and the clock rate $f_{sn}$ of the set is 1/4 reduced to $f_{sn}'$ to provide two series of four-value digital strings D6 and D7 which in turn are supplied to narrow band series roll off filters 8a and 8b having a filter characteristic shown at (b) in FIG. 6, so that the four-value digital string of each series is applied with band limitation and waveform shaping.

In order for the four series of digital signals having signal waveforms shaped as described previously to be compressed in requisite transmission band and so permitted for transmission by means of a single carrier wave, the clock rates of the four series of four-value digital strings are converted at the roll off filters, each having the form of a digital filter, into a unified input clock rate $f_{so}$ mega bit/second which is common to the respective series, and filter output signals at the same clock rate are supplied to multipliers 4a to 4d. Signals applied to the multipliers 4a and 4b modulate wide band series intermediate carrier waves $f_{cw}$ (cos) and $f_{cw}$ (sin) whose phases are orthogonal to each other. Similarly, signals applied to the multipliers 4c and 4d modulate narrow band series intermediate carrier waves $f_{cn}$ (cos) and $f_{cn}$ (sin) whose phases are orthogonal to each other. Modulated intermediate carrier waves $f_{cw}$ and $f_{cn}$ of the respective series delivered out of the respective multipliers 4a to 4d have forms which are sampled at the common sampling frequency $f_{so}$ mega bit/second as shown in FIG. 5 and therefore they can be added to each other. Firstly, modulated intermediate carrier waves $f_{cw}$ from the wide band series multipliers 4a and 4b are synthesized together by an adder 5a and modulated intermediate carrier waves $f_{cn}$ from the narrow band series multipliers 4c and 4d are synthesized together by an adder 5b, and then synthesized output signals of modulated intermediate carrier waves $f_{cw}$ and $f_{cn}$ of the wide and narrow bands are synthesized by an adder 5c so as to be unified into a single digital signal. The obtained single digital signal is then sequentially passed through a D/A converter 9 and a low-pass filter 10a so as to be supplied to a multiplier 4e at which the digital signal waveform modulates an RF carrier of a suitable carrier frequency $f_r$ in analog fashion and a modulated signal is passed through a band-pass filter (11) so as to be delivered as an RF output. The low-pass filter 10a and band-pass filter 11 have filter characteristics shown at (c) and (d) in FIG. 6, respectively, and operate to eliminate unnecessary band components.

Preferable examples of numerical values applied to the clock rates appearing as shown in FIG. 5 at the respective stages of the digital modulator shown in FIG. 3 will be specified as below.

When as described previously the multi-valued level is k=4, the thin-out ratio is 1:m=5:6 and the clock rate $f_{so}$ of the input binary code string is $f_{so}$=18 mega bit/second, the clock rate $f_{sw}$, the clock rate $f_{sw}'$ after level conversion and the intermediate carrier frequency $f_{cw}$ in the wide band series have the following values, respectively:

$f_{sw}=f_{so}\times 5/6$, $f_{sw}'=f_{sw}\times 1/4=f_{so}\times 5/6\times 1/4$, $f_{cw}=(7/25)f_{so}$.

The clock rate $f_{sn}$, the clock rate $f_{sn}'$ after level conversion and the intermediate carrier frequency $f_{cn}$ in the narrow band series have the following values, respectively:

$f_{sn}=f_{so}\times 1/6$, $f_{sn}'=f_{sn}\times 1/4=f_{so}\times 1/6\times 1/4$, $f_{cn}=(3/25)f_{so}$.

With these numerical values, transmission bit rate of wide band series

=3.75×4=15 mega bit/second, and transmission bit rate of narrow band series

=0.75×4=3 mega bit/second are obtained, demonstrating that transmission can be effected sufficiently by the divisional channels of wide and narrow bands of 3.75 MHz and 0.75 MHz half-widths shown in FIG. 1.

Since the bit rates of the respective stages in the modem of the present invention are correlated to each other in simple integer relationship or integer ratio relationship as previously described, the clock rate of each stage can be reproduced easily during demodulation by detecting and reproducing the clock rate of any stage from the carrier modulated with the single synthesized digital signal as described previously.

Also, as described previously, the digital modulation spectral distribution in the RF band shown in FIG. 1 is obtained by dividing one channel of 6 MHz band of the standard type television into the two divisional channels of wide and narrow bands of 4.5 MHz and 1.25 MHz at the boundary of the video carrier frequency, thus providing a transmission spectrum having a split at the video carrier of NTSC signal. Consequently, the radio interference jamming in the same channel exerting from the video signal low-band component of large transmission power on the ATV broadcasting wave can be reduced significantly when compared to that in the prior art. Further, the voice carrier of NTSC signal can also be outside the band of wide band divisional channel and its jamming exerting on the ATV broadcasting wave can be minimized.

As described previously, in the modem of the present invention, the clock rate and intermediate carrier frequency of one stage are correlated to those of another stage in simple integer relation or integer ratio relation. Therefore, in a digital demodulator shown in FIG. 4, by receiving the carrier modulated with the single synthesized digital signal and detecting and reproducing any one clock rate or intermediate carrier frequency, another clock or intermediate carrier frequency can be reproduced easily through the use of a read only memory (ROM) storing the relative ratio relation among the clock rates of the respective stages or a phase locked loop (PLL).

Accordingly, in the demodulator shown in FIG. 4, the aforementioned modulated carrier is supplied as an RF input signal in parallel to multipliers 4f and 4h and a carrier regenerative circuit 12, the wide band series transmission carrier $(f_r+f_{cw})$ is reproduced at the carrier regenerative circuit 12 by using the modulation spectrum component of wide band divisional channel, the carrier $(f_r+f_{cw})$ is supplied to a multiplier 4h to demodulate the RF input signal so as to take out the component of wide band series modulated intermediate carrier $f_{cw}$ which, in turn, is supplied to a clock regenerative circuit 13, the thus reproduced wide band series clock rate $f_{sw}$ is supplied to a various clock carrier regenerative circuit 14, and, as previously described the clock rates and carrier frequency of the respective stages necessary for demodulation are all reproduced as illustrated on the basis of the wide band series clock rate $f_{sw}$. The wide band series intermediate carrier $f_{cw}$ is supplied, together with the wide band series transmission carrier $(f_r+f_{cw})$ from the carrier regenerative circuit 12, to a multiplier 4g to reproduce the RF carrier fr. The thus reproduced RF carrier fr is supplied to the multiplier 4f to demodulate the RF input in analog fashion, and a synthesized digital signal of digital signals based on the fundamental clock rate $f_{so}$ and, assuming the same spectral distribution in the digital modulator output, is sequentially passed through a low-pass filter 10b and an A/D converter 15 so as to be delivered out.

The synthesized digital signal thus reproduced is supplied to a wide band series roll off filter 3c and a narrow band roll off filter 8c. The wide band series roll off filter 3c has the same filter characteristic as the roll off filters 3a and 3b of the modulator shown in FIG. 3 and the narrow band series roll off filter 8c has the same filter characteristic as the roll off filters 8a and 8b of the modulator, so that 3 dB attenuations at cut-off frequency 1.875 MHz in modulation and demodulation are combined to provide an overall filter characteristic of 6 dB attenuation at a cut-off frequency which is a wide band Nyquist frequency and 3 dB attenuations at cut-off frequency 0.375 MHz in modulation and demodulation are combined to provide an overall filter characteristic of 6 dB attenuation at a cut-off frequency which is a narrow band Nyquist frequency. The wide band series digital signal component delivered out of the roll off filter 3c is supplied to multipliers 4i and 4j so as to be demodulated under the application of wide band series intermediate carriers $f_{cw}$ (cos) and $f_{cw}$ (sin) whose phases are orthogonal to each other as in the case of the modulator shown in FIG. 3. Similarly, the narrow band series digital signal component delivered out of the roll filter 8c is supplied to multipliers 4k and 4l so as to be demodulated under the application of narrow band series intermediate carriers $f_{cn}$ (cos) and $f_{cn}$ (sin) whose phases are orthogonal to each other. Demodulated output digital signals from the multipliers 4i and 4j are supplied to wide band series decision circuits 16a and 16b at which signal levels of the wide band series digital signals are decided to reproduce the output level of 2-phase, 4-level conversion in the modulator. Similarly, demodulated output digital signals from the multipliers 4k and 4l are supplied to narrow band series decision circuits 17a and 17b at which signal levels of the narrow band series digital signals are decided to reproduce the output level of 2-phase, 4-level conversion in the modulator.

Figure 7:
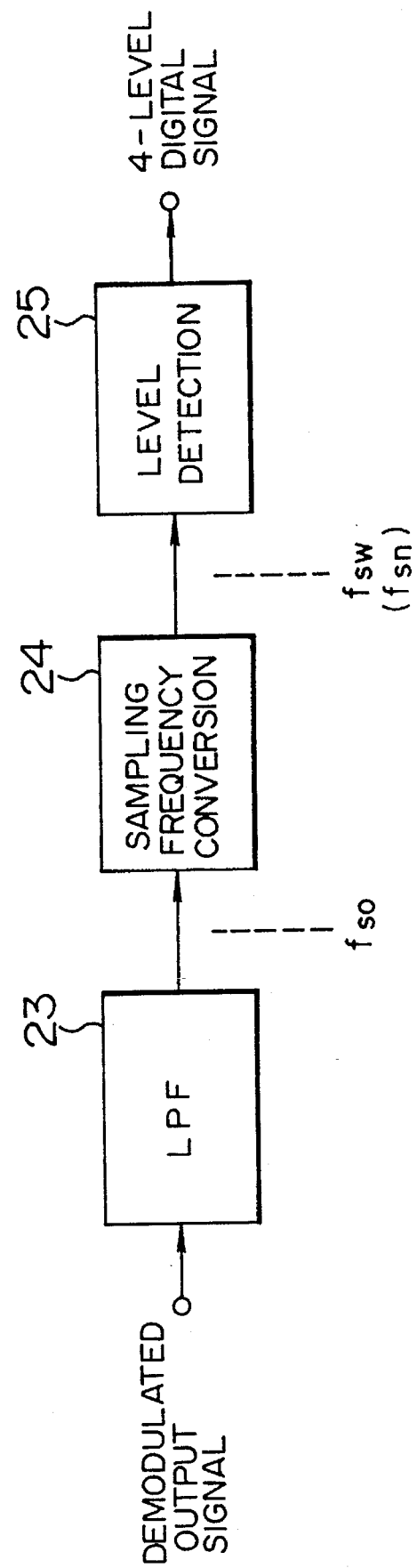
FIG. 7 is a block diagram showing an example of construction of a stabilizer circuit used in the digital demodulator according to the present invention.

Each of the decision circuits 16a and 16b and of the decision circuits 17a and 17b is constructed as shown in FIG. 7, whereby the quadrature demodulated output, 4-level digit string of wide band or narrow band series is supplied to a low-pass filter 23 so as to be removed of higher spurious components of the quadrature demodulated output and thereafter supplied to a sampling frequency conversion circuit 24. Since the clock rates of the quadrature demodulated output 4-level digit strings of wide band series and narrow band series are unified to the fundamental input clock rate f for the convenience of mutual synthesis of these strings in the modulator, they are converted to the original clock rates through temporal conversion to clock rates $f_{sw}'$ and $f_{sn}'$ occurring after 2-phase 4-level conversion and ultimate conversion to sampling frequencies for sampling the middle of one period of the most opened eye-pattern, that is, clock rates $f_{sw}$ and $f_{sn}$ occurring before 2-phase 4-level conversion. The output digital string of wide band or narrow band series thus converted in clock rate is supplied to a level detection circuit 25 so that decision as to the four levels may be carried out.

The output 4-level digital string of wide band series thus level decided is supplied to a 2-phase, k-level inverse conversion circuit, for example, 2-phase, 4-level inverse conversion circuit 18 so as to under go a level conversion process inverse to that applied in the modulator shown in FIG. 3, and the output binary digital string of wide band series thus level inverse converted is supplied to an m:1 rate conversion circuit, for example, 6:5 rate conversion circuit 20 at which the binary digital group of a clock rate $f_{so}$ mega bit/second is reproduced on the basis of the wide band series after thin-out in the modulator. Similarly, the output 4-level digital string of narrow band series thus level decided is supplied to a 2-phase, k-level inverse conversion circuit, for example, 2-phase, 4-level inverse conversion circuit 19 so as to undergo a level conversion process inverse to that applied in the modulator, and the output binary digit string of narrow band series thus level inverse converted is supplied to an m:(m-1) rate conversion circuit, for example, 6:1 rate conversion circuit 21 at which the binary digit group of a clock rate $f_{so}$ mega bit/second is reproduced on the basis of the narrow band series after thin-out in the modulator. The thus reproduced binary groups of wide band series and narrow band series are supplied to a synthesis circuit 22, so that the input binary coded information signal is reproduced as a digital demodulated output signal.

Since in the aforementioned demodulator the roll off filter processing, quadrature demodulation and level decision are carried out digitally, a processing operation more stable than ordinary analog processing can be expected.

The foregoing embodiment of the invention is described by way of example of the divisional transmission wherein a digital information signal of one channel is divided into two divisional channels of wide and narrow bands but the number of divisional channels is not limited to two in this example. Also, in the foregoing embodiment, the conversion level number k and digital thin-out rate 1:m are k=4 and 1:m=5:6, respectively, but they may be desired integer and desired integer ratio. Further, the clock rate of the input binary code string is exemplified as 18 mega bit/second but it is by no means specified exclusively to this value. In addition, the cut-off characteristic of the roll off filter is equally distributed at 3 dB to the modulation and demodulation sides but as far as the overall 6 dB cut-off characteristic is obtained for the paired roll off filters, the distribution value may vary between the modulation and demodulation sides.

In the foregoing description, the input binary code string to the digital modem of the invention is described as being the coded television image signal but it may be any digital information signal of any information contents. Further, the existing electric wave causing the radio interference jamming in the same channel is described as being the television broadcasting electric wave of standard type, for example, NTSC type but it is not limited to this type.

If, in the demodulator having the construction previously described two carriers of frequencies of $(f_r+f_{cw})$ and $(f_r+f_{cn})$ are reproduced as carriers used for analog demodulation of the input transmission signal, the signal processing covering the extreme processing of level decision of reproduced digital signal can be realized with analog circuits.

As is clear from the foregoing description, according to the invention, in contrast to the prior art wherein a sufficient countermeasure against radio interference jamming in the same channel exerting from the adjacent broadcasting area is not taken into consideration when such broadcasting as ATV broadcasting based on digital modulation and demodulation is performed by utilizing an idle channel in ground broadcasting of television, the radio interference jamming in the same channel can be reduced significantly as compared to the prior art by performing the multi-channel modulation using a plurality of bands which are split at frequency positions of video and voice carriers of the radio interference jamming broadcasting wave.

In addition, by selecting the clock rates and intermediate carrier frequencies used in the respective stages of the digital modem according to the invention such that they are correlated in simple integer relation or integer ratio relation, the signal processing in each stage can be performed digitally, thus attaining a beneficial effect that stability of the modem as a whole can be improved significantly. Therefore, many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A digital modem comprising:

digital thin-out means for dividing an input binary code string, every period of m digits, into at least a first series of 1 digits binary code string and a second series of (m-1) digits binary code string and for converting said first series binary code at 1:m clock rate and said second series binary code at (m-1):m clock rate to form first and second continuous binary code strings, 1 being unequal to (m-1);

means for generating first and second intermediate carriers;

first and second digital modulators, each modulating, respectively, said first and second intermediate carriers with said first and second continuous binary code strings respectively, said first digital modulator generating a first modulated carrier which is transmitted in a higher frequency band between video and voice carriers in one channel of a conventional television broadcasting system, and said second digital modulator generating a second modulated carrier which is transmitted in a lower frequency band below said video carrier in said one channel of the conventional television broadcasting system to use an idle channel of the conventional system in one area, said channel being the same as one channel of the conventional system used in another area adjacent to said one area, to reduce radio interference therebetween;

first and second demodulators, each demodulating, respectively, said first and second modulated carriers to reproduce said first and second continuous binary code strings;

first and second clock rate conversion means, each converting, respectively, a clock rate of said reproduced first and second continuous binary code strings into said first series of 1 digits binary code string and said second series of (m-1) digits binary code string respectively; and digital synthesis means for synthesizing said first series of 1 digits binary code string and said second series of (m-1) digits binary code string to produce said input binary code string.

2. A digital modem according to claim 1, further comprising:

code level conversion means for converting said first and second continuous binary code strings into first and second multi-value code strings, each of said first and second digital modulators modulating, respectively, said first and second intermediate carriers with said first and second multi-value code strings respectively;

modulator means for modulating an RF carrier with said first and second multi-phase modulated intermediate carriers;

demodulation means for demodulating said modulated RF carrier;

first and second intermediate demodulator means for reproducing said multi-value code strings; and first and second reverse code level conversion means for converting said multi-value code strings to said continuous binary code strings.

* * * * *